United States Patent
Chen et al.

(10) Patent No.: US 9,071,480 B2
(45) Date of Patent: Jun. 30, 2015

(54) UNIFIED INTERFERENCE POWER ESTIMATION

(71) Applicant: Broadcom Corporation, Irvine, CA (US)

(72) Inventors: Hou-Shin Chen, San Diego, CA (US); Fu-Hsuan Chiu, Berkeley Heights, NJ (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 14/033,818

(22) Filed: Sep. 23, 2013

(65) Prior Publication Data

US 2015/0078429 A1  Mar. 19, 2015

Related U.S. Application Data

(60) Provisional application No. 61/878,405, filed on Sep. 16, 2013.

(51) Int. Cl.
| | | |
|---|---|---|
| *H04L 1/00* | (2006.01) | |
| *H04L 25/08* | (2006.01) | |
| *H04B 1/10* | (2006.01) | |
| *H04L 25/03* | (2006.01) | |
| *H03K 6/04* | (2006.01) | |
| *H03K 5/01* | (2006.01) | |
| *H03D 11/04* | (2006.01) | |
| *H03D 1/06* | (2006.01) | |

(52) U.S. Cl.
CPC ............................... *H04L 25/03159* (2013.01)

(58) Field of Classification Search
CPC .................. H04L 25/03057; H04L 27/2647; H04L 1/1027; H04L 1/30; H04L 27/2035; H04L 27/2275; H04L 1/707
USPC ......................................... 375/284, 316, 348
See application file for complete search history.

(56) References Cited

U.S. PATENT DOCUMENTS

| 7,430,248 B2* | 9/2008 | McCallister .................. 375/296 |
|---|---|---|
| 7,469,491 B2* | 12/2008 | McCallister et al. ......... 375/296 |
| 2005/0152480 A1* | 7/2005 | Chang et al. .................. 375/343 |
| 2006/0067446 A1* | 3/2006 | Maeda et al. ................. 375/349 |
| 2010/0027589 A1* | 2/2010 | Bastug et al. ................. 375/148 |

* cited by examiner

*Primary Examiner* — Ted Wang
(74) *Attorney, Agent, or Firm* — Brinks Gilson & Lione

(57) ABSTRACT

A communication device, such as a smart phone, includes logic to determine a noise power estimate. In an example, a frequency domain calculation may be used to determine noise components within the noise power estimate. Further, a product of a channel estimate and equalizer effect may be used in the determination of the levels noise components, such as, inter-symbol interference power and neighbor cell interference power.

20 Claims, 4 Drawing Sheets

US 9,071,480 B2

UNIFIED INTERFERENCE POWER ESTIMATION

PRIORITY CLAIM

This application claims priority to U.S. Provisional Application Ser. No. 61/878,405, filed Sep. 16, 2013, which is incorporated herein by reference in its entirety.

TECHNICAL FIELD

This disclosure relates to signal transmission. This disclosure also relates to interference estimation in technologies such as cellular telephones and other devices.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at over 85% of the world's population. Furthermore, past estimates have indicated that (as just three examples) the United States, Italy, and the UK have more mobile phones in use in each country than there are people even living in those countries. Improvements in wireless communication devices, particularly in their robustness to signal interference, will help continue to make such devices attractive options for the consumer.

DETAILED DESCRIPTION

The disclosure below concerns techniques for unified interference power estimation. A wide variety of different electronic devices may implement these techniques. Accordingly, the user equipment example described below provides an example context for explaining the estimation techniques. In other words, the user equipment is just one example of a wide array of electronic devices that may incorporate the estimation techniques.

Figure 1:
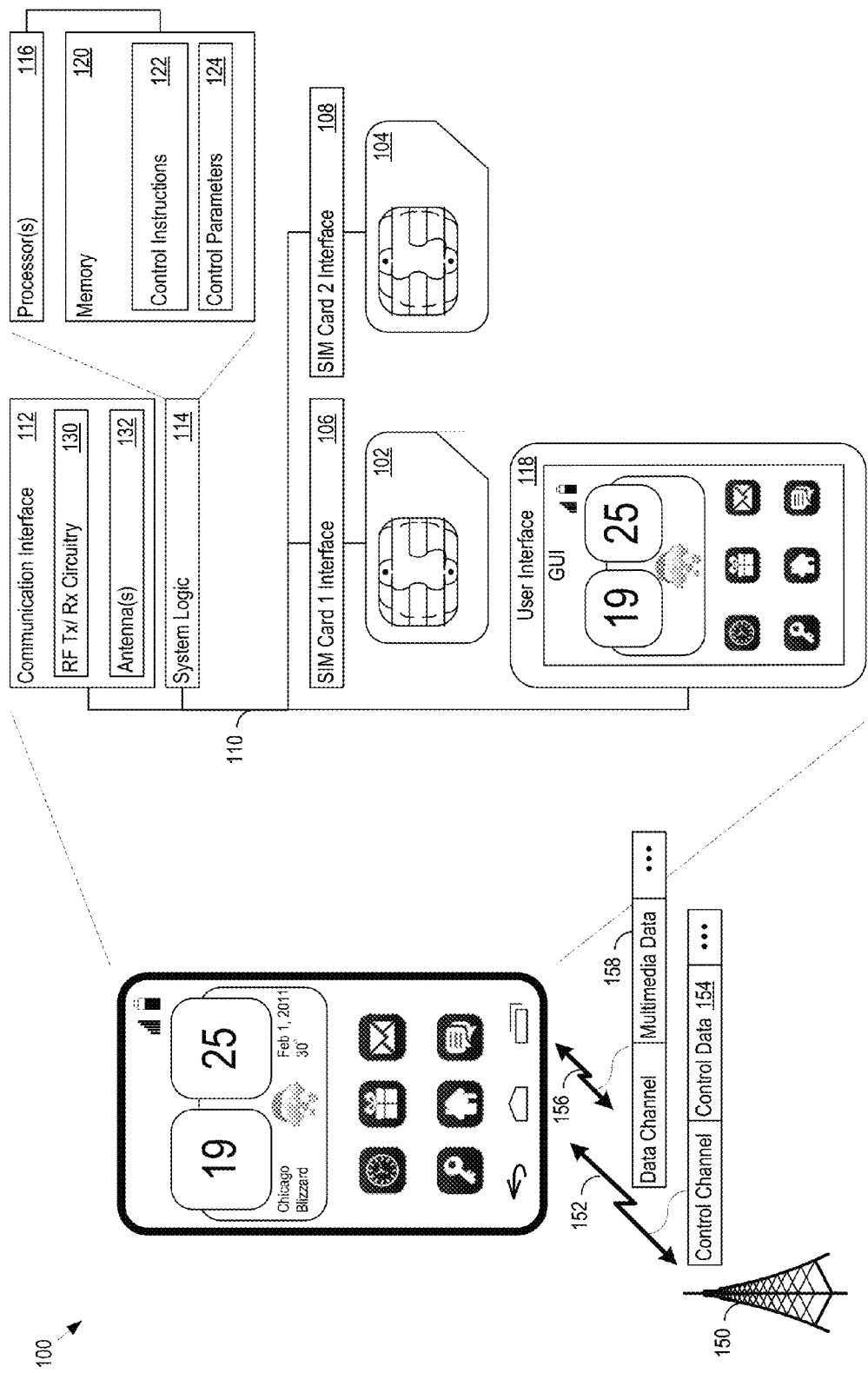
FIG. 1 shows an example of user equipment (UE 100).

In FIG. 1, the user equipment (UE) 100 may take many different forms and have many different functions. As one example, UE 100 may be a 2G, 3G, or 4G/LTE cellular phone capable of making and receiving wireless phone calls, and transmitting and receiving data. The UE 100 may also be a smartphone that, in addition to making and receiving phone calls, runs any number or type of applications. UE 100 may be virtually any device that transmits and receives information, including as additional examples a driver assistance module in a vehicle, an emergency transponder, a pager, a satellite television receiver, a networked stereo receiver, a computer system, music player, or virtually any other device. The techniques discussed below may also be implemented in other devices, such as a base station or other network controller that communicates with the UE 100. A UE 100 may include multiple wireless interfaces. Transmissions from a first of the multiple wireless interfaces may be treated as interference on a second of the multiple interfaces. Knowledge of the transmission from the first of the multiple wireless interfaces may be used to cancel effects arising from transmission from the first interface on reception at the second of the multiple interfaces.

FIG. 1 shows an example of user equipment (UE 100) 100. The UE 100 may be in data communication with a network controller 150, e.g., an enhanced Node B (eNB) or other base station, access point, or other network controller. In some cases, the UE 100 may support one or more Subscriber Identity Modules (SIMs), such as the SIM1 102 and the SIM2 104. Electrical and physical interfaces 106 and 108 connect SIM1 102 and SIM2 104 to the rest of the UE 100 hardware, for example, through the system bus 110.

The UE 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any functionality in the UE 100. In that regard, the system logic 114 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 may include a graphical user interface, touch sensitive display, voice or facial recognition inputs, buttons, switches, speakers or other user interface elements.

In the communication interface 112, Radio Frequency (RF) transmit (Tx) and receive (Rx) circuitry 130 handles transmission and reception of signals through the antenna(s) 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The Rx/Tx circuitry may further include signal processing logic to support channel and noise power estimation. In various implementations, the signal processing logic may include equalizers to support accurate decoding the control data 154 sent on the control channel via the network controller 150. The control data may include, data channel 156 allocation information, call setup setup/teardown data, or other operational parameters. The data channel 156 may carry the multimedia data 158 between the network controller 150 and the UE 100. The multimedia data 158 may include voice data, image data, file data, audio/visual data, Internet web page data, or other data types. The channel may be allocated by the network controller using a time-division multiple access (TDMA), frequency-division multiple access (FDMA), or orthogonal domain multiple access (ODMA) schemes. In some cases, a combination of two or more of the above multiple access schemes. For example, code-division multiple access (CDMA) may include TDMA and FDMA elements.

The transmitted and received signals may adhere to any of a diverse array of formats, protocols, modulations, e.g., QPSK, 16-QAM, 64-QAM, or 256-QAM, frequency channels, bit rates, and encodings. As one specific example, the communication interface 112 may support transmission and reception under the 4G/Long Term Evolution (LTE) standards. The techniques described below, however, are applicable to other communications technologies, such as 3G telecommunications services, whether arising from the 3rd Generation Partnership Project (3GPP), GSM (R) Association, Universal Mobile Telecommunications System (UMTS), High Speed Packet Access (HSPA)+, or other partnerships or standards bodies. The communications interface 112 may support 2G voice and/or data. For example TDMA digital voice calling and Enhanced Data for Global Evolution (EDGE) and/or general packet radio service (GPRS) may be supported by the communications interface 112. The communications interface may 112 also include 802.11a/b/g/n/ac/ad transceivers, Bluetooth (BT), Near Field Communications (NFC). The UE 100 may have any number of these radios on or active at any time.

The system logic 114 may include one or more processors 116 and memories 120. The memory 120 stores, for example, control instructions 122 that the processor 116 executes to carry out any of the processing or control functionality described below, operating in communication with the circuitry in the communication interface 112. For example, the system logic 114 may reprogram, adapt, or modify parameters or operational characteristics of the logic in the communication interface 112 and/or in the system logic 114 itself. In some implementations, the functionality system logic 114 may be implemented in or by the communication interface 112.

The control parameters 124 provide and specify configuration and operating options for the control instructions 122. As will be explained in more detail below, the memory 120 may also store parameters for estimation of interference component, such as algorithms measured conditions, or other parameters.

As noted above, the UE 100 is in communication with the network controller 150 over one or more control channels 152. The network controller 150 sends messages to the UE 100 over the control channels 152. The messages may include operating parameters 154, such as power control parameters, bandwidth allocation parameters, or other operating parameters.

Figure 2:
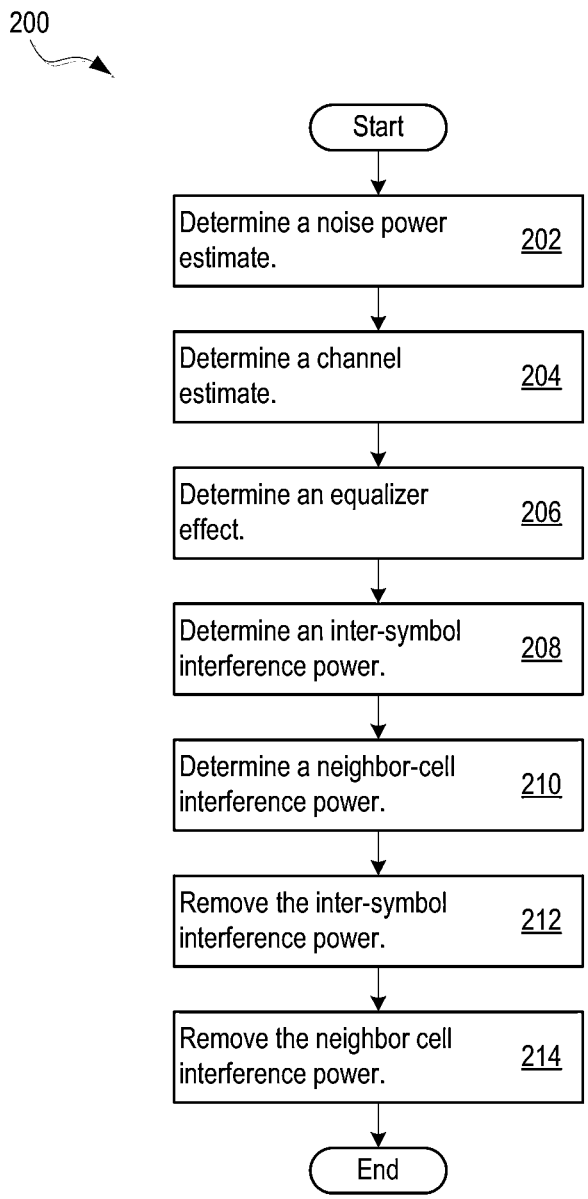
FIG. 2 shows an example of logic 200 ("logic 200") for noise power estimation.

The UE 100 is one example of a communication device that may include enhanced noise power estimation techniques. FIG. 2 shows an example of logic 200 ("logic 200") for noise power estimation. The UE 100 may implement the logic 200, as examples, in the control instructions 122 or in hardware, software or firmware in the communication interface 112.

In the example of FIG. 2, the logic 200 may determine a noise power estimate including multiple different noise components (202). For example, the logic 200 may estimate a noise power including an inter-symbol interference power, a neighbor cell interference power, and/or other noise components. The logic 200 may decode a portion of a known symbol sequence, e.g., a training, pilot, or preamble synchronization symbol sequence, or other known symbol sequence, within a received signal. The decoding may be performed by a decoder/despreader within the logic 200. The logic may determine a signal-to-noise ratio (SNR) using the known symbol sequence. For example, the logic 200 may measure a power level for the portion the known symbol sequence and measure a power level for the other remaining contributions at the frequency under test to determine the SNR. In some cases, the power associated with the remaining contributions may be used as the noise power. Additionally or alternatively, the logic 200 may determine a bit-error rate (BER) to determine an estimate of the SNR. From the determined SNR, the logic 200 may then determine an estimate of the noise power which is related to the power level of the known symbol sequence by the SNR. Additionally or alternatively, the logic may determine an estimate of the noise power using the determined SNR and the total received power, e.g. using a received signal strength indication (RSSI), and/or other measurement of received power, at the frequency under test. Additionally or alternatively, a minimum mean squared estimate (MMSE), such as a linear MMSE (LMMSE), may be applied [by the logic 200 to successive samples of the received portion of the known symbol sequence to determine the noise power estimate.

Signals received at a UE 100 may experience effects, such as attenuation, dispersion, delay, fading, multi-path effects, and/or other physical effects, as the signals propagate from their source to the UE 100 over a physical channel, such as a wireless or wireline medium. For example, physical effects may be present for an HSDPA and/or LTE/LTE-A system in a region with many signal propagation disturbances, e.g. trees, buildings, moisture, or other objects. The logic 200 may determine a channel estimate (204). A channel estimate may serve as a representation of the physical effects of the channel. The physical channel represented by the channel estimate may correspond to the physical channel for which the noise power estimate was made. In some implementations, the estimated channel may be represented in a vector and/or other data structure, e.g., in the memory 120. In various implementations, the channel estimate may be obtained via a decoding operation of a portion of the known symbol sequence. For example, during transmission a signal may be exposed to a dispersive medium, such as the atmosphere, and may undergo spreading in response. In some implementations, the logic 200 may compare the received spread version to the known symbol sequence to determine a level of spreading. Similarly, the logic 200 may apply comparisons, such as correlations, duration comparisons, power level comparison and/or other compressions to determine the level of other physical effects.

The logic 200 may determine an equalizer effect responsive to the estimated channel (206). In some cases, the equalizer may attempt to apply effects equal and opposite to the physical effects of the channel. The logic 200 may determine an equalizer effect which may be a representation of the applied effects. In some implementations the equalizer effect may be obtained by inverting the estimated channel. For example, for an estimated channel, h and corresponding channel convolution matrix H, the equalizer effect may be obtained using:

$$G = W^{-1} \cdot H^H$$

$$G = (HH^H + \sigma^2 I)^{-1} \cdot H^H \qquad \text{Equation 1}$$

Where $\sigma^2$ is the noise power estimate, I is the identity matrix, and G is the equalizer effect. In some implementations, the logic 200 may apply a timefrequency transform, e.g. Fourier transform, Laplace transform, fast Fourier transform (FFT), inverse fast Fourier transform (iFFT) or other timefrequency transforms, to the estimated channel (or a function of the estimated channel) prior to inversion. A time frequency transform may include virtually any transform resulting in conjugate variable pairs. For example, a transform that expresses a function in terms a set of periodic functions, moments, and/or other harmonics. In various implementations, a timefrequency transform may include time-to-frequency transforms and frequency-to-time transforms. In some cases, applying a timefrequency transform may result increased computational efficiency during the inversion process. For example, a time-frequency transform may change a system of $O(N^2)$ operations into a corresponding system of $O(N)$ operations. In various implementations, the equalizer may include a frequency-domain equalizer (FDEQ). The FDEQ may be implemented as a vector computational unit (VCU).

In some cases, it may be advantageous for the logic 200 to determine estimates of some other components of the noise power estimate. For example, the noise power may be contribute to the term $\sigma^2 I$ in various determinations of the equalizer effect. $\sigma^2 I$ may contribute to diagonal terms in the solution matrix (W) for the equalizer effect. In some cases, determined noise components in the noise power may not properly be treated as diagonal terms. In some implementations, the noise power contribution to the diagonal terms of W may be overestimated. For example the noise power may include powers of inter-symbol interference, neighbor cell interference, and/or other components.

In some cases, a convolution operation in time may correspond to a multiplication in frequency, or vice versa. Some quantities may be unaffected or invariant under timefrequency transforms. For example, integrated power may be invariant under timefrequency transforms. The power can be estimated in the time and frequency domains.

The logic 200 may determine an inter-symbol interference component based on the product of the estimated channel and the equalizer effect (208). The product may be performed in the frequency domain and corresponds to a convolution of the estimated channel and the equalizer effect.

In some implementations, the logic 200 may use the product to obtain a ratio of inter-symbol interference to the signal power, Risi. Where $Pisi=Risi \times Ps$, Pisi is the inter-symbol interference component, and Ps is the serving cell signal power. Ps may be obtained from removing the noise power estimate (Pn) from the measured power of the FDEQ output. In various implementations Risi may be calculated as:

$$Risi = \frac{Pc - Pfp}{Pfp} \qquad \text{Equation 2}$$

Where Pc is the total power of the post-equalizer equivalent channel coefficient, and Pfp is the first tap power of the post-equalizer equivalent channel coefficient. In some implementations, Pc may be represented as a summation of absolute value squared of the frequency domain product of the equalizer effect and the estimated channel. Pfp may be represented as the absolute value squared of the summation of the frequency domain product of the equalizer effect and the estimated channel.

In various implementations Pfp may be expressed as:

$$Pfp = \left\| \frac{1}{N} \sum_{k=0}^{N-1} \hat{Q}[k] \right\|^2 \qquad \text{Equation 3}$$

Where $\hat{Q}[k]=\hat{H}[k]\cdot\hat{G}[k]$ and $\hat{H}[k]$ is the timefrequency transform of h, and $\hat{G}[k]$ is the timefrequency transform of g.

In various implementations Pc may be represented as:

$$Pc = \frac{1}{N} \sum_{k=0}^{N-1} \left\| \hat{Q}[k] \right\|^2 \qquad \text{Equation 4}$$

Where $\hat{Q}[k]=\hat{H}[k]\cdot\hat{G}[k]$ and $\hat{H}[k]$ is the timefrequency transform of h, and $\hat{G}[k]$ is the frequency domain equalizer coefficient, and N is the FFT size used in FDEQ implementation.

Equations 3 and 4 may be combined with Equation 2 to determine Risi.

In some cases, the logic 200 may determine a neighbor cell interference power component based on the product of the estimated channel and the equalizer effect (210). In some implementations, the product may be used to determine obtain a ratio of the jth neighbor cell interference power to the serving cell's signal power, Ris,j. Where $Pis,j=Ris,j \times Ps$, Pis,j is the jth neighbor cell interference component, and Ps in the serving cell signal power. Ris,j and Pis,j may be calculated for multiple neighbor cells which may be combined, for example additively, to determine the neighbor cell interference estimate Pis.

In various implementations, Ris,j may be represented as:

$$Ris, j = \frac{Pc, j}{Pfp} \qquad \text{Equation 5}$$

Where Pfp is the first tap power of the post-equalizer equivalent channel coefficient. As discussed above, Pfp may be represented as shown in Equation 3 in some implementations. Pc,j is the total power of the post-equalizer equivalent channel coefficient for the jth neighbor cell. In some implementations, Pc may be represented as a summation of absolute value squared of the frequency domain product of the equalizer effect for the jth neighbor cell and the estimated channel for the jth neighbor cell. For example Pc,j may be expressed as:

$$Pc, j = \frac{1}{N} \sum_{k=0}^{N-1} \left\| \hat{Q}_j[k] \right\|^2 \qquad \text{Equation 6}$$

Where $\hat{Q}_j[k]=\hat{H}_j[k]\cdot\hat{G}_j[k]$ and $\hat{H}_j[k]$ is the timefrequency transform of $h_j$ (the channel estimate for the jth neighbor cell), and $\hat{G}_j[k]$ is the frequency domain equalizer coefficient of the jth neighbor cell (the equalizer effect for the jth neighbor cell), and N is the FFT size used in FDEQ implementation.

Equations 5, 6 and the serving cell's signal power are used to determine Ris,j. In some implementations Pis,j may be summed over j to determine Pis.

In various implementations, the logic 200 may remove the inter-symbol interference component from the noise power estimate (212). For example, the inter-symbol interference component may be subtracted from the noise power.

In various implementations, the logic 200 may remove the neighbor cell interference component from the noise power estimate (214). For example, the neighbor cell interference power component may be subtracted from the noise power.

Removal of the inter-symbol interference power estimate and/or neighbor cell interference power estimate from the noise power estimate by the logic 200 may result in the corrected noise power estimate. After the noise power estimate NE, the residual inter-symbol interference power ISI is estimated. The neighbor cell's interference power ISC,j is estimated for j=1, 2, . . . ncells, where ncells is the number of interfering neighbor cells. The inter-symbol interference power and summation of ISC,j is then removed from NE to obtain a corrected noise power.

In some cases, the determined inter-symbol interference component and/or the neighbor cell interference component may be larger than the noise power, e.g. individually or additively. In some implementations, the corrected noise power may have a zero or negative value. In some cases, a zero or negative value for the corrected noise power may be associated with a non-physical result. It may be advantageous for the logic 200 to implement a system by which a zero or negative corrected noise power is determined by the logic 200 to be a positive value, e.g. a small positive number. In some implementations, the corrected noise power may be determined by the logic 200 using:

If $NP > (Pisi + Pis)$ then:  Equation 7

$CNP = NP - Pisi - Pis$

If $NP \leq (Pisi + Pis)$ then:

$CNP = \dfrac{Pisi + Pis}{M}$

Where NP is the noise power estimate, CNP is the corrected noise power estimate, and M is large positive value, e.g. M>>1. In various implementations individual comparisons of the inter-symbol interference power component or the neighbor cell interference power component with the noise power estimate may be used. In some implementations a UE 100 may operate in an increased sampling rate mode. For example, signal may be provided to the UE 100 with an associated symbol rate. In some cases, it may be advantageous for the UE 100 to sample the received signal at a rate greater than the symbol rate. In some implementations, a sampling rate double that of the symbol rate may be selected (Cx2). In a Cx2 system, two symbol phases may present an even phase and an odd phase. For example at twice the symbol rate, successive samples may be 180° out of phase. For a Cx2 system $\hat{Q}[k]$ may be computed by the logic 200 by adding the even and odd phase products:

$\hat{Q}[k] = \hat{H}_e[k] \cdot \hat{G}_e[k] + \hat{H}_o[k] \cdot \hat{G}_o[k]$ $\hat{Q}_j[k] = \hat{H}_{e,j}[k] \cdot \hat{G}_{e,j}[k] + \hat{H}_{o,j}[k] \cdot \hat{G}_{o,j}[k]$  Equation 8

Where $\hat{H}_{e,j}[k]$, $\hat{H}_e[k]$, $\hat{G}_{e,j}[k]$, and $\hat{G}_e[k]$ correspond to even phase samples, and $\hat{H}_{o,j}[k]$, $\hat{H}_o[k]$, $\hat{G}_{o,j}[k]$, and $\hat{G}_o[k]$ correspond to odd phase samples.

In some implementations, the determination and application of the corrected noise power may be applied by the logic 200 in a multiple receive environment, e.g. multiple-input multiple-output (MIMO), multiple-input single-output (MISO), multiple receive (RxD) and/or other multiple receive environments. The multiple receive channels may apply individual noise power estimates and/or channel estimates. The logic 200 may apply the corrected noise power determination to the individual noise power estimates and/or channel estimates. In some cases, multiple receive channels may experience similar geometries. In some implementations, the logic 200 may apply the determined inter-symbol interference power components, neighbor cell interference power components, and/or corrected noise powers associated with a first receive channel to a second receive channel different from the first, e.g. with different associated antenna and/or hardware. In some cases logically separated inputs may use common determined inter-symbol interference power components, neighbor cell interference power components, and/or corrected noise powers.

In some implementations, the logic 200 may be implemented in part on a FDEQ. In some cases, it may be advantageous to implement portions the logic 200 on a FDEQ to perform frequency domain determinations of the inter-symbol interference power component and/or the neighbor cell interference power component. Various terms used in determination of the inter-symbol interference power component and the neighbor cell interference power component may have common structure in frequency domain representations. FDEQ determinations may allow for reuse of determined quantities across the inter-symbol and neighbor cell determinations. Additionally or alternatively, the similar structures may allow for reuse of software/hardware blocks across the inter-symbol and neighbor cell determinations. In some cases, the similar structures may be viewed as a unified algorithm for determination of the inter-symbol interference power component and neighbor cell interference power component.

Figure 3:
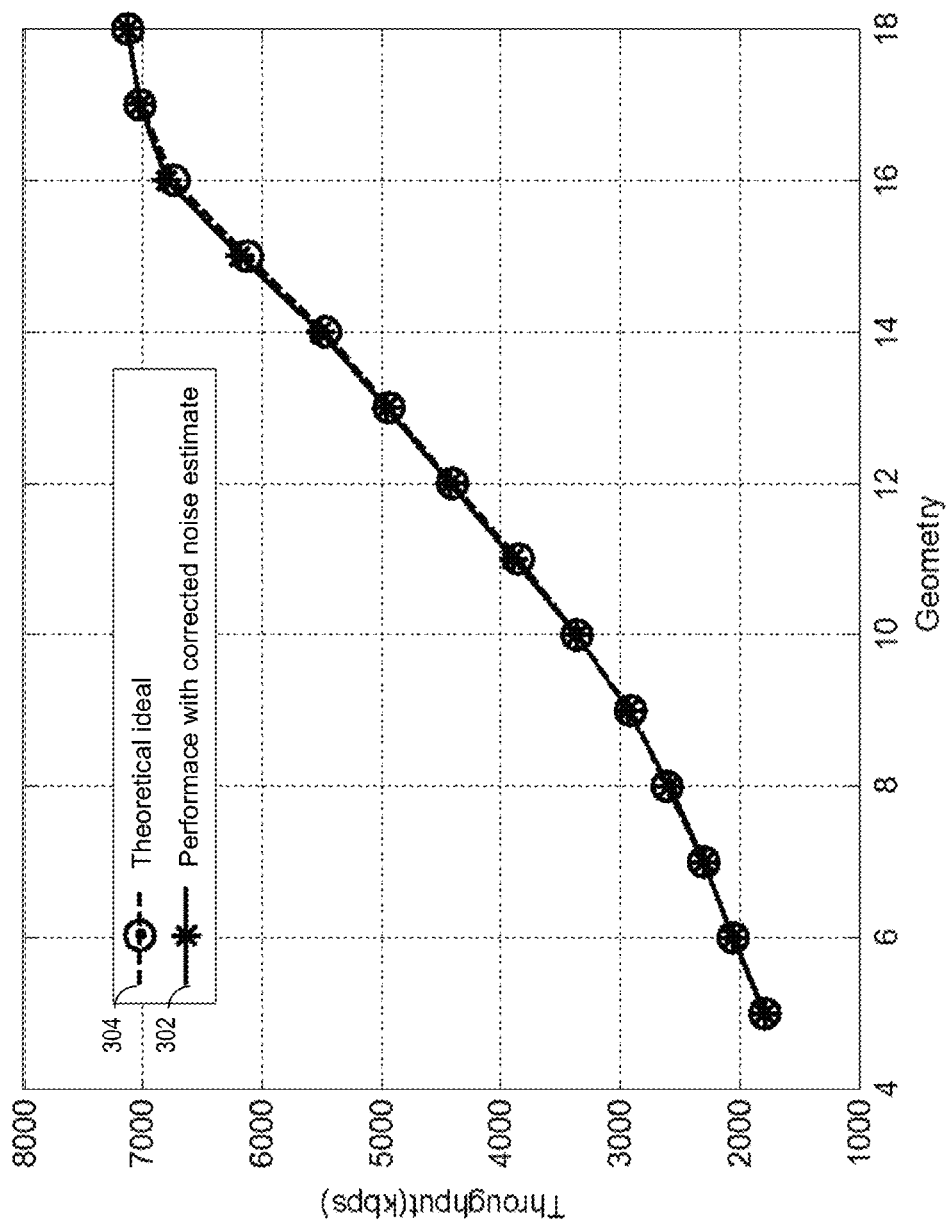
FIG. 3 shows example noise estimation performance 302 in an example sampling environment.

FIG. 3 shows example noise estimation performance 302 in an example sampling environment. The example noise estimation performance based on the corrected noise power estimate is plotted against theoretical ideal performance 304. The example environment is for a pedestrian traveling at 3 km/h in multipath conditions. The receiving device, in the example is using dual receive channels, and sampling at twice the symbol rate of the received signal (Cx2). The received signal uses a 64 state quadrature amplitude modulation (64-QAM) constellation. The horizontal axis shows the geometry of the environment; a lower SNR is associated with a higher geometry. For a system with a constant physical profile (fading, multipath, and other physical effects), increasing the throughput of the system will reduce the SNR and increase the geometry. As the results demonstrate, the enhanced noise estimation techniques described above facilitate throughput performance that is very close to the theoretical ideal performance.

Figure 4:
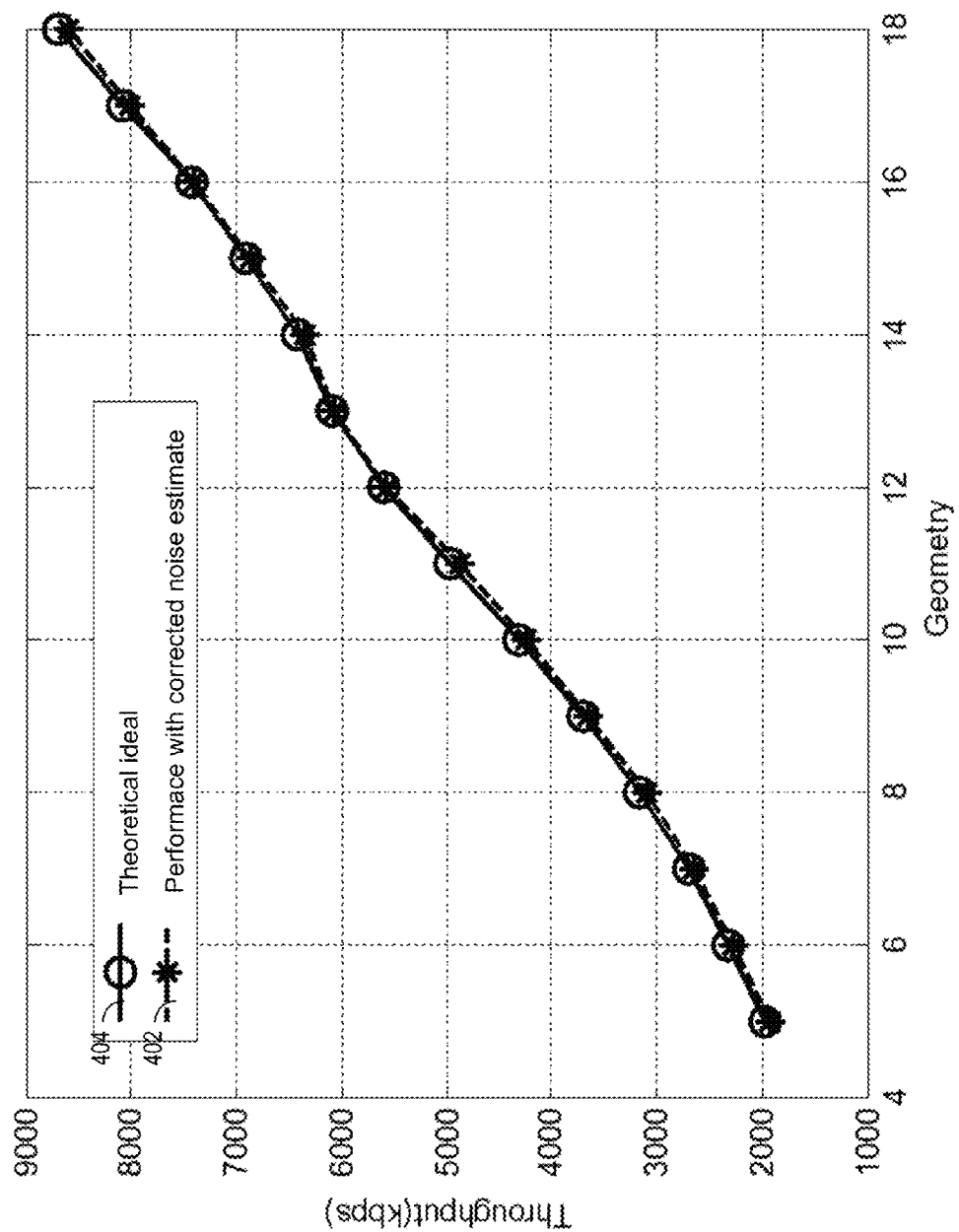
FIG. 4 shows example noise estimation performance 402 in an example sampling environment.

FIG. 4 shows example noise estimation performance 402 in an example sampling environment. The example noise estimation performance based on the corrected noise power estimate is plotted against theoretically ideal performance 404. The example environment is for a vehicle traveling at 120 km/h in multipath conditions. The receiving device, in the example is using dual receive channels, and sampling using Cx2. The received signal uses a 64-QAM constellation. As with FIG. 3, throughput is shown on the vertical axis and geometry is shown on the horizontal axis in the plot of FIG. 4. For this highly mobile (motion at 120 km/h) environment, the enhanced noise estimation techniques described above facilitate throughput performance that is very close to the theoretical ideal performance.

The methods, devices, and logic described above may be implemented in many different ways in many different combinations of hardware, software or hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various implementations have been described, it will be apparent to those of ordinary skill in the art that many more embodiments and implementations are possible within the scope of the disclosure.

What is claimed is:

1. A method, comprising;
   at processing circuitry in a communication device:
   determining a noise power estimate comprising multiple different noise components;
   determining an inter-symbol interference power estimate based on a product of an estimated channel and an equalizer effect, the inter-symbol interference power estimate associated with a resolution of multiple samples per symbol sent by a first device via a physical channel; and
   removing the inter-symbol interference power estimate from the noise power estimate.

2. The method of claim 1, further comprising:
   determining a neighbor-cell interference power estimate also based on the product of the estimated channel and the equalizer effect, the neighbor-cell interference power estimate being associated with a noise component generated via a second device different from the first device; and
   removing the neighbor-cell interference power estimate from the noise power estimate.

3. The method of the claim 2, where the generating of the neighbor-cell interference power estimate further comprises determining a function of a summation of the product.

4. The method of claim 3, where the generating of the inter-symbol interference power estimate comprises determining the function of the summation of the product; and
   the generating of the inter-symbol interference power estimate further comprises determining the summation of the function of the product.

5. The method of claim 1, where determining the noise power comprises determining an interference-to-signal ratio associated with a received portion of a known signal.

6. The method of claim 1, where determining the equalizer effect further comprises inverting the estimated channel to obtain the equalizer effect.

7. The method of claim 1, further comprising transforming a time domain channel estimate to a frequency domain to obtain the estimate channel.

8. The method of claim 7, further comprising decoding a portion of a known symbol sequence to obtain the time domain channel estimate.

9. The method of claim 8, further comprising determining a signal-to-noise ratio based on the decoded portion to determine the noise power estimate.

10. The method of claim 1, where generating the inter-symbol interference power estimate based on the product comprises; determining a ratio of the inter-symbol interference power estimate to a signal power.

11. A system, comprising:
    channel estimator circuitry configured to:
    determine a noise power estimate comprising multiple different noise components; and
    determine an estimated channel for a physical channel associated with the noise power;
    equalizer circuitry configured to invert the estimated channel configured to obtain an equalizer effect; and
    processing circuitry in data communication with the channel estimator circuitry and the equalizer circuitry, the processing circuitry configured to:
    determine an inter-symbol interference power estimate based on a product of the estimated channel and the equalizer effect, the inter-symbol interference power estimate being associated with a resolution of multiple symbols sent by a first device via the physical channel; and
    remove the inter-symbol interference power estimate from the noise power estimate.

12. The system of claim 11, where the processing circuitry is further configured to:
    determine a neighbor cell neighbor-cell noise estimate also based on the product of the estimated channel and the equalizer effect, the neighbor-cell noise estimate being associated with a noise component generated via a second device different from the first device; and
    remove the neighbor-cell noise estimate from the noise power estimate.

13. The system of claim 11, where the equalizer circuitry comprises frequency domain equalizer (FDEQ) circuitry configured to perform the inversion in a frequency domain.

14. The system of claim 13, where the FDEQ circuitry and the processing circuitry comprises a vector computational unit.

15. The system of claim 11, where the channel estimator circuitry comprises decoder circuitry configured to decode a portion of a known sequence to obtain the estimated channel and the noise power estimate.

16. The system of claim 11, further comprising a power sensor to determine a power output of the equalizer circuitry.

17. The system of claim 16, where the processing circuitry is further configured to:
    determine a signal power based on a difference of the power output and the noise power estimate; and
    determine the inter-symbol interference power estimate based on a ratio of the signal power and an inter-symbol interference.

18. A device, comprising:
    a receiver configured to receive an input signal;
    decoder circuitry configured to decode a portion of a known symbol sequence from within the input signal;
    channel estimator circuitry configured to determine an estimated channel and noise power estimate based on the portion of the known symbol sequence;
    frequency domain equalizer (FDEQ), circuitry configured to invert the estimated channel to obtain a FDEQ effect;

a power sensor configured to determine a power output of the FDEQ; and processing circuitry configured to:
- determine a first ratio of signal power to inter-symbol interference based on a frequency domain product of the estimated channel and the FDEQ effect;
- determine a second ratio of signal power to neighbor cell interference based on the frequency domain product of the estimated channel and the FDEQ effect;
- determine an inter-symbol interference power estimate based on the first ratio and a difference of the power output of the FDEQ and the noise power estimate;
- determine an estimate of a neighbor cell interference power estimate based on the second ratio and the difference; and
- remove the inter-symbol interference power estimate and the estimate of the neighbor cell interference power estimate from the of the noise power estimate to obtain a corrected noise power.

19. The device of claim 18, where the processing circuitry is further configured to:
- substitute a positive value for the corrected noise power when a sum of the inter-symbol interference power estimate and the neighbor cell interference power estimate are greater than the noise power estimate.

20. The device of claim 18, where the processing circuitry is further configured to determine the second ratio based on a second frequency domain product of an neighbor cell estimated channel and a neighbor cell FDEQ effect.

* * * * *